(12) United States Patent
Miyasaka

(10) Patent No.: US 6,506,284 B1
(45) Date of Patent: Jan. 14, 2003

(54) REDUCED-PRESSURE DISTILLATION SYSTEM

(76) Inventor: Tetsuo Miyasaka, 2-33-20, Kita-Otsuka, Toshima-ku, Tokyo (JP)

( * ) Notice: Subject to any disclaimer, the term of this patent is extended or adjusted under 35 U.S.C. 154(b) by 0 days.

(21) Appl. No.: 09/396,796

(22) Filed: Sep. 15, 1999

(30) Foreign Application Priority Data

Jun. 23, 1999 (JP) ............................................ 11-176513

(51) Int. Cl.$^7$ .............................. B01D 3/10; C02F 1/04
(52) U.S. Cl. ................. 202/205; 159/22; 159/DIG. 16; 203/1; 203/2; 203/91; 202/160
(58) Field of Search ................................. 203/10, 11, 1, 203/2, DIG. 17, 91, 100; 159/DIG. 42, 22, DIG. 16, 44; 202/205, 269, 160

(56) References Cited

U.S. PATENT DOCUMENTS

| | | | | |
|---|---|---|---|---|
| 4,046,637 A | * | 9/1977 | Sasaki | 202/174 |
| 5,281,310 A | * | 1/1994 | Djelouah et al. | 202/185.1 |
| 5,630,913 A | * | 5/1997 | Tajer-Ardebili | 202/205 |
| 5,744,008 A | * | 4/1998 | Craven | 203/10 |
| 5,762,763 A | * | 6/1998 | Tsargorodski | 203/11 |
| 6,197,162 B1 | * | 3/2001 | Quiros | 203/11 |

FOREIGN PATENT DOCUMENTS

| | | |
|---|---|---|
| JP | 5-253405 | 10/1993 |
| JP | 6-320140 | 11/1994 |
| JP | 9-150001 | 6/1997 |

* cited by examiner

*Primary Examiner*—Virginia Manoharan
(74) *Attorney, Agent, or Firm*—Finnegan, Henderson, Farabow, Garrett & Dunner, L.L.P.

(57) ABSTRACT

There is provided a reduced-pressure distillation system, which is relatively simple in construction, easy in operation without depending only on driving of a vacuum pump, and therefore can be manufactured and operated at low costs. The system includes an impure water tank, a separating tank, a drainage tank, and a collecting tank. The impure water tank, the drainage tank, and the collecting tank each has an outside pressure communicating chamber, which makes contact with outside pressure, and a cell, which communicates with the outside pressure communicating chamber corresponding thereto and is sealed with respect to the outside pressure during operation of the system. The separating tank is sealed with respect to outside pressure and has an evaporator provided therein. Impure water is fed from the cell of the impure water tank to the evaporator, by using an effective head between levels of the impure water in the impure water tank and priming supplied to the drainage tank. Remaining water in the evaporator is discharged to the cell of the drainage tank. Purified water in a bottom portion of the separating tank, which is obtained by evaporating the impure water by activation of the evaporator, is collected into the cell of the collecting tank. The cells of the respective tanks communicate with each other via the separating tank. Evacuation within the separating tank is carried out to keep each cell in a pressure-reduced state.

4 Claims, 5 Drawing Sheets

REDUCED-PRESSURE DISTILLATION SYSTEM

BACKGROUND OF THE INVENTION

1. Field of the Invention

This invention relates to a reduced-pressure distillation system, which is capable of producing fresh water or clean water of high purity by removing impurities from impure water (e.g., sea water), drainage, and the like, or capable of collecting useful materials from various kinds of discharge liquor containing useful materials, by using a vacuum distillation method or a reduced-pressure distillation method on an energy saving basis.

2. Description of the Prior Art

To obtain fresh water from, for instance, sea water, there are conventionally known various methods, such as a distillation method (i.e., the evaporation method) for heating sea water to distill clean water, a reverse osmosis method for obtaining fresh water by pressurizing sea water to allow the same to pass through a semi-permeable membrane, an electrodialysis for removing salt content from sea water by introducing the water between ion exchange membranes, a freezing method for freezing sea water to obtain fresh water from the thus frozen water, and the like.

In addition, there is also known a vacuum distillation method, alternatively referred to as a reduced-pressure distillation method, in which impure water such as sea water is heated and boiled in an evaporator under vacuum or reduced pressure to generate vapor, followed by cooling the thus generated vapor in a condenser, to thereby collect condensed water. In the vacuum distillation method or the reduced-pressure distillation method, in general, when water is transformed in phase from a liquid phase through a gaseous phase into a liquid phase, a huge amount of thermal energy exchange is generated. To mitigate the thermal energy exchange, the method concerned is characterized by low-temperature distillation by reducing pressure within a container.

Each of the above-mentioned conventional methods, however, requires not only increased facilities costs, but also huge amounts of labor and costs for operational maintenance and control. For example, the reverse osmosis method, which uses a semi-permeable membrane, or the electrodialysis, which uses an ion exchange membrane, each require a membrane with excellent performance for satisfying either pressure resistance or permeability of a specific solution, which renders the conventional method extremely expensive when implemented. In addition, each method inevitably includes complicated procedures such as maintenance, inspection, component exchange during operation of the system.

To cope with the above-mentioned inconveniences, reduced pressure distillation systems having various constructions, have been proposed by applying thereto the vacuum distillation method or the reduced-pressure distillation method, in an attempt to economically and effectively use thermal energy or to operate the system on an energy saving basis or in an efficient manner.

For instance, a vacuum distillation system for distilling and purifying clean water from impure water, such as ground water, agricultural water, industrial water, water for domestic use, has been proposed, for instance, by Japanese Patent Laid-Open Publication No. Hei6-320140. According to the vacuum distillation system, water is supplied to a feed water preheater while an evaporator is filled with water to a predetermined upper limit level, and then the water in the evaporator is heated by activating a refrigerant compressor, followed by cooling a condenser. Further, the interiors of the evaporator and the condenser are kept to low pressure close to vacuum, and then the water is boiled at a relatively low temperature close to a room temperature. Thus, vapor generated in the evaporator passes through an evaporation tube, emits heat in the feed water preheater, and then is introduced into the condenser to be condensed. When the water level in the evaporator drops to a predetermined lower limit level, remaining water in the evaporator is discharged and at the same time condensed purified water in the condenser is collected. According to the vacuum distillation system, energy generated by a solar power, such as solar battery, is employed for energizing an auxiliary electric heater provided for the evaporator, and therefore thermal energy utilization is economically implemented.

Further, a distillation system for distilling useful materials and solvents from a mixed solution containing various materials on a drastic energy saving basis has been proposed, for example, by Japanese Patent Laid-Open Publication No. Hei5-253405. The distillation system is provided with a distiller having a vapor generating chamber and a heat exchanging chamber, and includes solution introducing means for introducing the mixed solution at high temperature into the vapor generating chamber while outside air is prevented from entering the distiller, and drainage discharging means for discharging condensed drainage while outside air is prevented from entering the distiller. In addition, the system includes condensed solution discharging means for discharging the condensed solution containing useful materials into the heat exchanging chamber while outside air is prevented from entering the same, and air excluding means for excluding air within the distiller by blowing air-excluding vapor and interrupting permeation of outside air into the same, the vapor generating chamber and the heat exchanging chamber communicating with each other through a vapor flow path. As a result, distillation is always carried out under a low pressure environment without air remaining therein, to thereby achieve highly efficient distillation by low-pressure evaporation with a small temperature difference over a long time period.

Still further, a reduced-pressure distillation system has been proposed, for example, by Japanese Patent Laid-Open Publication No. Hei9-150001. The system includes a vapor generating block to which is connected a condenser block for carrying out condensation of vapor. Further connected to the condenser block is a storage block for storing a condensed solution. A vacuum pump extends to any or all of the storage block, the vapor generating block, and the condenser block such that pressure therein can be reduced. Further, the storage block has a feed path extending therefrom, for supplying the condensed solution to a supply block. The feed path with a predetermined length, has a first valve arranged thereacross at a location closer to the storage block and a second valve arranged thereacross at a location closer to the supply block and separated from the first valve with a predetermined storage interval. The two valves can be individually opened and closed, and therefore when the condensed solution after completion of condensation is supplied to the supply block, it is not required that reduced pressure in the storage block is released nor distillation work is interrupted. As a result, continuous reduced-pressure distillation can be efficiently achieved.

Although the above proposed reduced-pressure distillation systems have brought about various advantages such as economical and effective use of thermal energy, energy saving, or efficient operation of the systems, they not only have complicated arrangements and facilities, but also require operation and control of a vacuum pump, which unfavorably increase facilities costs.

The present inventors have made extensive and intensive studies and built prototypes in order to obtain a system which is manufactured at reduced facilities costs, as well as small in size, portable, easy in control and operation, and immediately available in an emergency such as disasters. As a result, the present inventors have successively developed a reduced-pressure distillation system which is relatively simple in construction, easy in operation without depending only on driving of a vacuum pump, and therefore can be manufactured and operated at low costs.

The reduced-pressure distillation system proposed here includes an impure water tank, a separating tank, a drainage tank, and a collecting tank, and the impure water tank, the drainage tank, and the collecting tank each has an outside pressure communicating chamber which makes contact with outside pressure such as atmospheric pressure, and a cell which communicates with the outside pressure communicating chamber corresponding thereto and is sealed with respect to outside pressure such as atmospheric pressure during operation of the reduced-pressure distillation system. The separating tank is sealed with respect to outside pressure such as atmospheric pressure and has an evaporator provided therein. The reduced-pressure distillation system is further comprised of feeding means for feeding impure water from the cell of the impure water tank to the evaporator of the separating tank, by using an effective head between a level of impure water stored in the impure water tank and a level of priming supplied to the drainage tank, discharging means for discharging remaining water in the evaporator to the cell of the drainage tank, collecting means for collecting purified water stored in a bottom portion of the separating tank into the cell of the collecting tank, the purified water being obtained by evaporating and condensing the impure water by activation of the evaporator of the separating tank, communicating means communicating with the cells of the impure water tank, the drainage tank, and the collecting tank, respectively, via the separating tank, and evacuation means for carrying out evacuation within the separating tank to keep each of the cells in a pressure-reduced state.

By virtue of the above construction, a reduced-pressure distillation system, which can overcome the aforementioned conventional inconveniences, can be easily obtained.

SUMMARY OF THE INVENTION

It is therefore an object of the present invention to provide a reduced-pressure distillation system which is relatively simple in construction, easy in operation without depending only on driving of a vacuum pump, and therefore can be manufactured and operated at low costs.

To attain the above objects, the present invention provides a reduced-pressure distillation system including an impure water tank, a separating tank, a drainage tank, and a collecting tank, the impure water tank, the drainage tank, and the collecting tank each having an outside pressure communicating chamber, which makes contact with outside pressure such as atmospheric pressure, and a cell, which communicates with the outside pressure communicating chamber corresponding thereto and is sealed with respect to the outside pressure during operation of the reduced-pressure distillation system, the separating tank being sealed with respect to the outside pressure and having an evaporator provided therein.

The reduced-pressure distillation system comprising means for feeding impure water from the cell of the impure water tank to the evaporator of the separating tank, by using an effective head between a level of impure water stored in the impure water tank and a level of priming supplied to the drainage tank, means for discharging remaining water in the evaporator to the cell of the drainage tank, means for collecting purified water stored in a bottom portion of the separating tank into the cell of the collecting tank, the purified water being obtained by evaporating the impure water by activation of the evaporator of the separating tank, means for communicating with the cells of the impure water tank, the drainage tank, and the collecting tank, respectively, through the separating tank, and means for carrying out evacuation within the separating tank to keep each of the cells in a pressure-reduced state.

In this case, the outside pressure communicating chamber of the impure water tank may be supplied with the impure water to a predetermined level, the outside pressure communicating chamber of the drainage tank may be supplied with the priming to a predetermined level, the outside pressure communicating chamber of the collecting tank may be supplied with priming consisting of clean water to a predetermined level, the cells of the impure water tank, the drainage tank, and the collecting tank, respectively, may be allowed to communicate with each other, and the separating tank may have its interior evacuated to reduce pressure within each of the cells, whereby levels of the impure water in the cell of the impure water tank, the priming in the cell of the drainage tank, and the priming consisting of the clean water in the cell of the collecting tank can be kept constant with respect to the outside pressure such as the atmospheric pressure.

Furthermore, after keeping constant the levels of the impure water in the cell of the impure water tank, the priming in the cell of the drainage tank, and the priming consisting of the clean water in the cell of the collecting tank, the cells of the impure water tank, the drainage tank, and the collecting tank, respectively, may be prevented from communicating with each other as appropriate, whereby the impure water in the cell of the impure water tank can be fed to the evaporator of the separating tank and the remaining water in the evaporator can be discharged to the cell of the drainage tank, by using the effective head between the level of the impure water stored in the impure water tank and the level of the priming in the drainage tank.

The above and other objects, features and advantages of the invention will be more apparent from the following detailed description taken in conjunction with the accompanying drawings.

DETAILED DESCRIPTION OF THE PREFERRED EMBODIMENTS

The invention will now be described in detail with reference to the drawings showing an embodiment thereof.
Construction of Reduced-Pressure Distillation System Referring first to FIG. 1, there is schematically illustrated the construction of a reduced-pressure distillation system according to an embodiment of the present invention. In the figure, reference numerals 10, 12, 14, and 16 designate an impure water tank, a separating tank, a drainage tank, and a collecting tank, respectively. The separating tank 12 has an evaporator 18 and a heater 20 provided therein.

Figure 1:
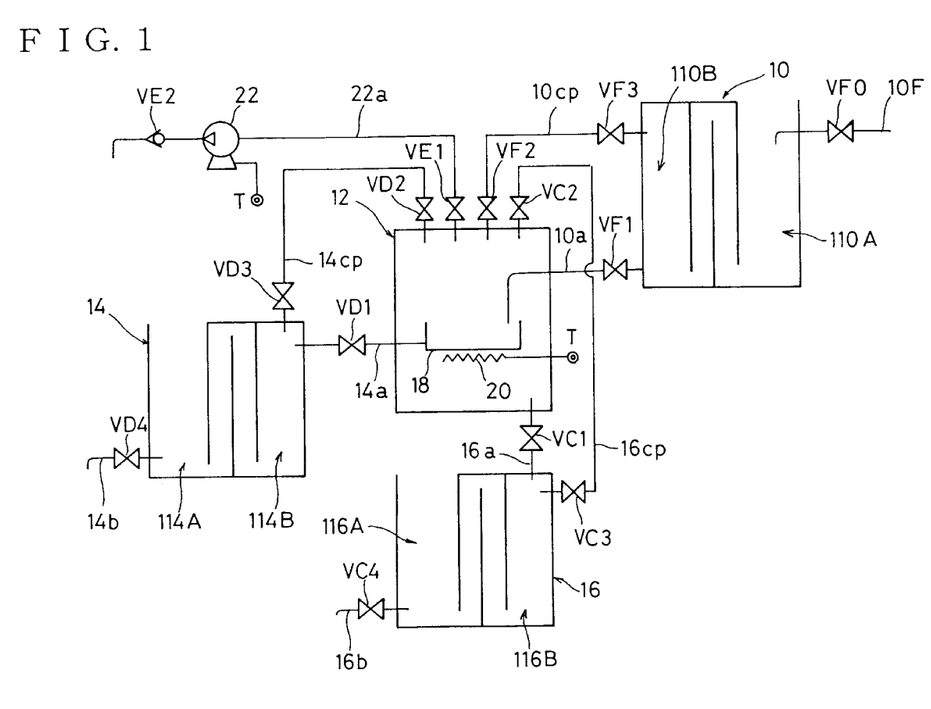
FIG. 1 is a schematic block and distribution diagram showing the arrangement of a reduced-pressure distillation system according to an embodiment of the invention.

The impure water tank 10 is comprised of an open-to-atmosphere chamber 110A and a cell 110B communicating with each other. The open-to-atmosphere chamber 110A functions as an outside pressure communicating chamber which is relieved to an atmosphere, for communicating with outside pressure such as atmospheric pressure, and the cell 110B is sealed with respect to the atmosphere during operation of the distillation system. Connected to the open-to-atmosphere chamber 110A is an impure water supply pipe 10F having an impure water supply valve VF0 arranged thereacross. Extending from the cell 110B to the separating tank 12 is a feed pipe 10a having a feed valve VF1 arranged thereacross, for feeding water to the evaporator 18. Further, the cell 110B of the impure water tank 10 communicates with the separating tank 12 at an upper portion thereof, through an impure water tank communicating pipe 10cp having impure water communicating valves VF2 and VF3 each arranged thereacross.

The drainage tank 14 is comprised of an open-to-atmosphere chamber 114A and a cell 114B communicating with each other. The open-to-atmosphere chamber 114A functions as an outside pressure communicating chamber which is relieved to the atmosphere, for communicating with outside pressure such as atmospheric pressure, and the cell 114B is sealed with respect to the atmosphere during operation of the distillation system. The cell 114B communicates with the evaporator 18 of the separating tank 12 through a drainage pipe 14a having a drainage valve VD1 arranged thereacross, to thereby discharge water remaining in the evaporator 18. Further, the cell 114B of the drainage tank 14 communicates with the separating tank 12 at the upper portion thereof, through a drainage tank communicating pipe 14cp having drainage tank communicating valves VD3 and VD2 each arranged thereacross. Still further, an external drainage pipe 14b extends from the open-to-atmosphere chamber 114A to the outside via a drainage tank switching valve VD4 arranged thereacross.

The collecting tank 16 is comprised of an open-to-atmosphere chamber 116A and a cell 116B communicating with each other. The open-to-atmosphere chamber 116A functions as an outside pressure communicating chamber which is relieved to an atmosphere, for communicating with outside pressure such as atmospheric pressure, and the cell 116B is sealed with respect to the atmosphere during operation of the distillation system. A collecting pipe 16a extends from a bottom portion of the separating tank 12 to the cell 116B. The collecting pipe 16a has a collecting valve VC1 arranged thereacross, and functions to collect purified water stored in the separating tank 12. Further, the cell 116B of the collecting tank 16 communicates with the separating tank 12 at the upper portion thereof, through a collecting tank communicating pipe 16cp having collecting tank communicating valves VC3 and VC2 each arranged thereacross. Still further, an external water intake pipe 16b extends from the open-to-atmosphere chamber 116A to the outside via a collecting tank switching valve VC4 arranged thereacross.

Further, an exhaust pipe 22a extends from the upper portion of the separating tank 12 to the outside via an exhaust valve VE1, a vacuum pump 22 and a check valve VE2 each arranged thereacross. The heater 20 and the vacuum pump 22 are electrically connected to power source terminals T, respectively, for being energized as appropriate.
Operation of Reduced-Pressure Distillation System Next, description will be made of the operation of the reduced-pressure distillation system constructed as above, with respect to an operation startup preparing stage, a reduced pressure adjusting stage immediately before the operation startup, and an operating stage, with reference to FIGS. 2 to 4.

(1) Operation Startup Preparing Stage

Figure 2:
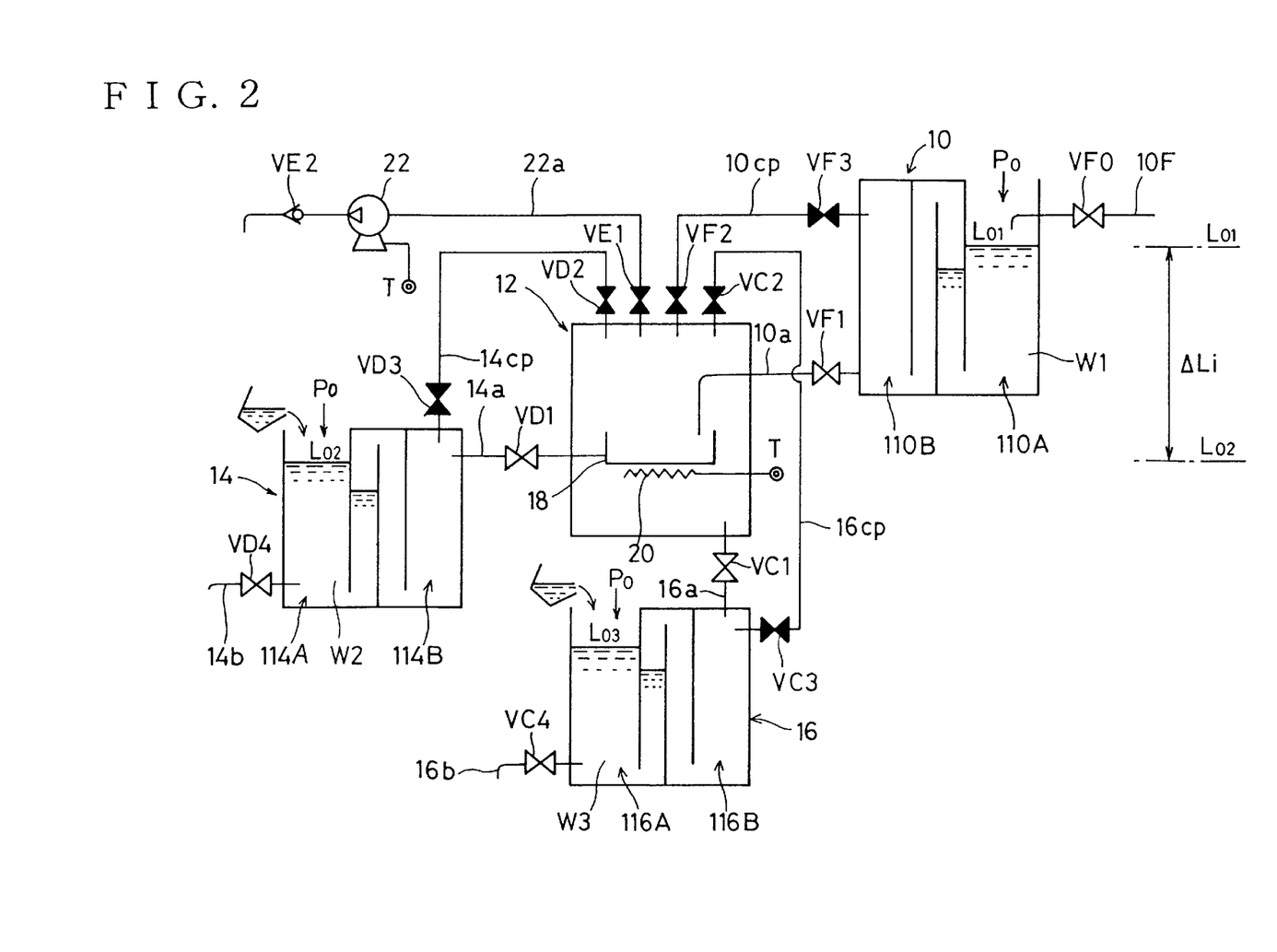
FIG. 2 is a schematic block and distribution diagram of the reduced-pressure distillation system of FIG. 1, showing an operation startup preparing stage.

As shown in FIG. 2, all the valves except for the drainage tank switching valve VD4, the collecting tank switching valve VC4, the feed valve VF1, the drainage valve VD1, and the collecting valve VC1, are opened, i.e. the impure water tank communicating valves VF2 and VF3, the drainage tank communicating valves VD2 and VD3, and the collecting tank communicating valves VC2 and VC3 are opened, and then water is fed to the open-to-atmosphere chambers 110A, 114A and 116A of the impure water tank 10, the drainage tank 14 and the collecting tank 16, respectively.

At this time, the impure water tank 10 is supplied with impure water W1 from the impure water supply pipe 10F, by opening the impure water supply valve VFO as appropriate. The drainage tank 14 is supplied with priming W2 such as impure water from the outside, and the collecting tank 16 is supplied with priming W3 consisting of clean water from the outside.

The impure water W1 stored in the open-to-atmosphere chamber 110A of the impure water tank 10 and the priming W2 stored in the open-to-atmosphere chamber 114A of the drainage tank 14 are set in a relationship such that a difference between an initial level L01 of the impure water W1 and an initial level L02 of the priming W2 has a predetermined head $\Delta$ Li(=L01−L02). The priming W3 consisting of clean water stored in the open-to-atmosphere chamber 116A of the collecting tank 16 has an initial level L03 thereof set at a location lower than the bottom portion of the separating tank 12.

(2) Reduced Pressure Adjusting Stage Immediately Before Operation Startup

Figure 3:
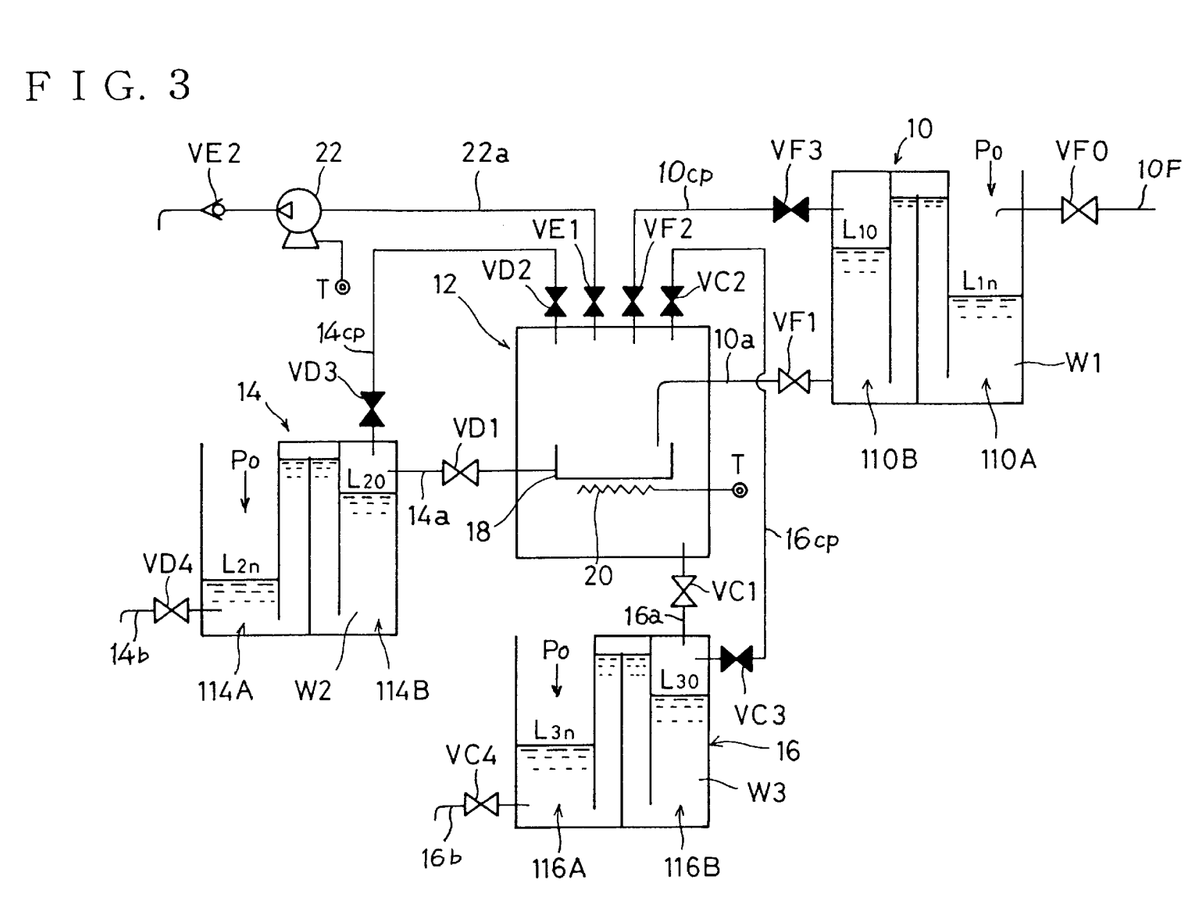
FIG. 3 is a schematic block and distribution diagram of the reduced-pressure distillation system of FIG. 1, showing a reduced pressure adjusting stage immediately before the operation startup.

Then, immediately before the operation startup of the distillation system, the vacuum pump 22 is driven while the feed valve VF1, the drainage valve VD1, and the collecting valve VC1 are kept closed, as shown in FIG. 3. Accordingly, evacuation of air is carried out in order to reduce the pressure in the cells 110B, 114B, and 116B of the impure water tank 10, the drainage tank 14, and the collecting tank 16, respectively. As a result, the levels of the impure water W1 in the impure water tank 10, the priming W2 in the drainage tank 14, and the priming W3 consisting of clean water in the collecting tank 16 are changed, so that a balance is maintained between the atmospheric pressure P0 affecting each of the open-to-atmosphere chambers 110A, 114A, and 116A and each of the pressure-reduced states in the cells 110B, 114B, and 116B.

At this time, a level L10 of the impure water W1 in the cell 110B of the impure water tank 10, a level L20 of the priming W2 in the cell 114B of the drainage tank 14, and a level L30 of the clean water W3 in the cell 116B of the collecting tank 16 are set to levels shown in FIG. 3. Accordingly, a changed level L1$n$ of the impure water W1, a changed level L2$n$ of the priming W2, and a changed level L3$n$ of the priming (clean water) W3 in the respective open-to-atmosphere chambers 110B, 114B, and 116B are also set to levels shown in FIG. 3.

(3) Operating Stage

Figure 4:
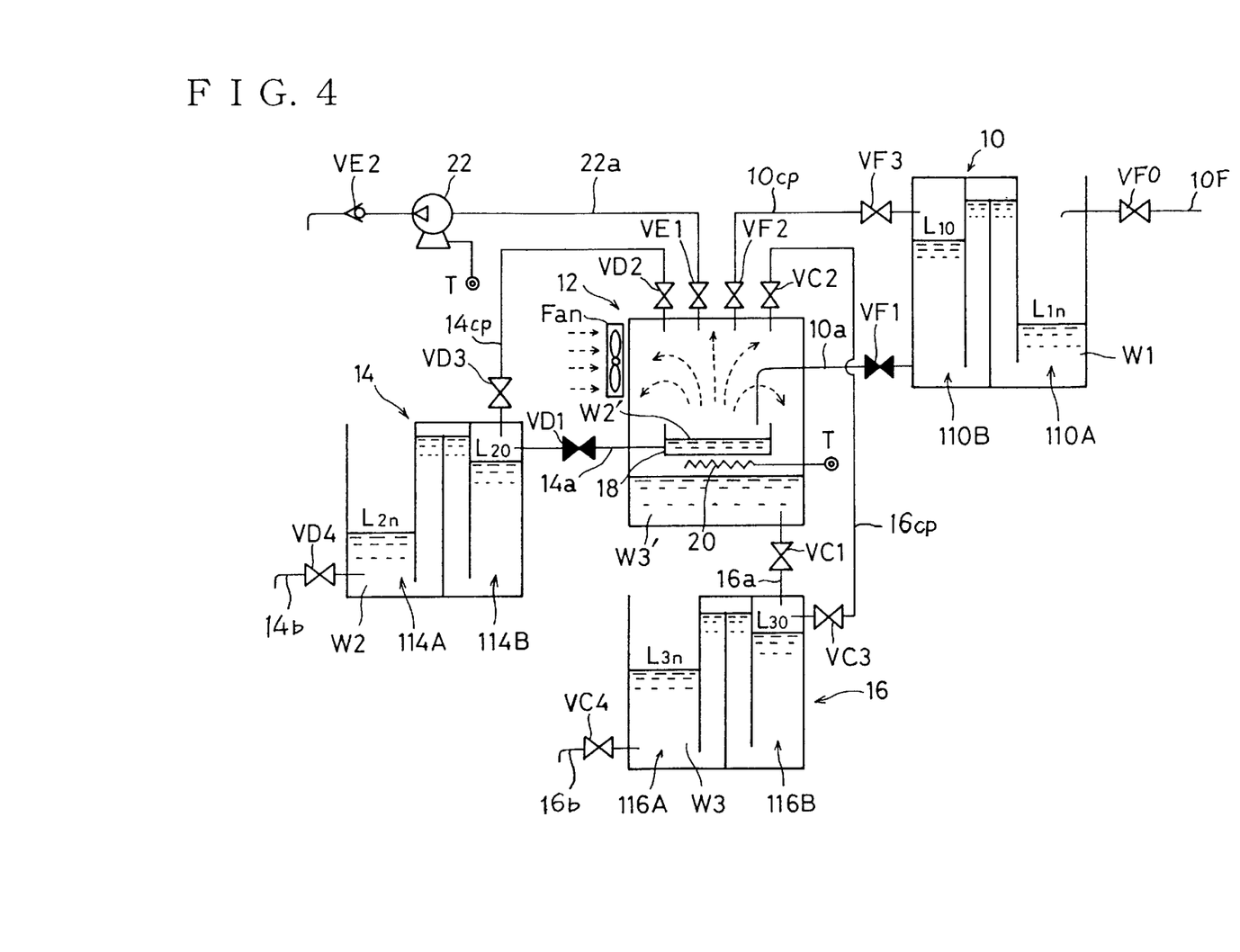
FIG. 4 is a schematic block and distribution diagram of the reduced-pressure distillation system of FIG. 1, showing a system operating stage.

As stated hereinabove, when the balance between the atmospheric pressure P0 and the reduced pressure in each cell is maintained in each of the impure water tank 10, the drainage tank 14, the collecting tank 16, and the separating tank 12, the impure water tank communicating valves VF2 and VF3, the drainage tank communicating valves VD2 and VD3, and the collecting tank communicating valves VC2 and VC3 are closed, and at the same time the feed valve VF1 and the drainage valve VD1 are opened, as shown in FIG. 4.

By setting the valves as above, the impure water W1 in the impure water tank 10 is supplied or dripped through the feed pipe 10$a$ into the evaporator 18 of the separating tank 12. The impure water W1 thus supplied into the evaporator 18 is heated and evaporated under reduced pressure by energization of the heater 20. The resultant vapor is then cooled and condensed to be condensed water which is stored in the bottom portion of the separating tank 12 as purified water W3'. Water W2' remaining in the evaporator 18 is collected through the drainage pipe 14$a$ into the drainage tank 14 as appropriate.

To allow the impure water W1 and the remaining water W2' to naturally flow down, an effective head ΔLi is set between an end of the feed pipe 10$a$ having the feed valve VF1, which end is connected to the impure water tank 10, and an end of the drainage pipe 14$a$ having the drainage valve VD1, which end is connected to the evaporator 18. The maximum effective head ΔLi is empirically set to approximate 0.5 m. As a result, by adjusting the opening of each of the valves VF1 and VD1, the impure water W1 can be continuously supplied to the evaporator 18 in an amount appropriate for evaporation.

At this time, the level L10 of the impure water W1 in the cell 110B of the impure water tank 10 is almost constant, and the level L1$n$ of the impure water W1 in the open-to-atmosphere chamber 110A is progressively changed to a lower level. On the other hand, the level L20 of the priming W2 in the cell 114B of the drainage tank 14 is almost constant, and the level L2$n$ of the priming W2 stored in the open-to-atmosphere chamber 114A is progressively changed to a higher level.

In this manner, after a predetermined time lapse, the level of the purified water W3' stored in the bottom portion of the separating tank 12 is progressively raised. Then, the collecting valve VC1 arranged across the collecting pipe 16$a$ communicating with the collecting tank 16 is opened, whereby the purified water W3' is collected into the collecting tank 16.

At this time, the level L30 of the clean water W3 in the cell 116B of the collecting tank 16 is constant, and the level L3$n$ of the clean water W3 in the open-to-atmosphere tank 116A is progressively changed to a higher level.

To extend a time period over which the impure water W1 comes into contact with a pressure-reduced gaseous phase in the evaporator 18, and to enlarge a contact surface area between the two phases, a flow surface of the impure water W1 may be formed into a return stepwise slope. As a result, evaporation of the impure water W1 can be accelerated.

In addition, to enhance condensation effect of vapor generated by the evaporator 18, the peripheral surface of the separating tank 12 may be cooled by air-blowing by means of an air blower fan Fan, etc. (see FIG. 4), as appropriate. As a result, condensation of vapor generated in the separating tank 12 can be accelerated.

Automated Control of Continuous Operation

Figure 5:
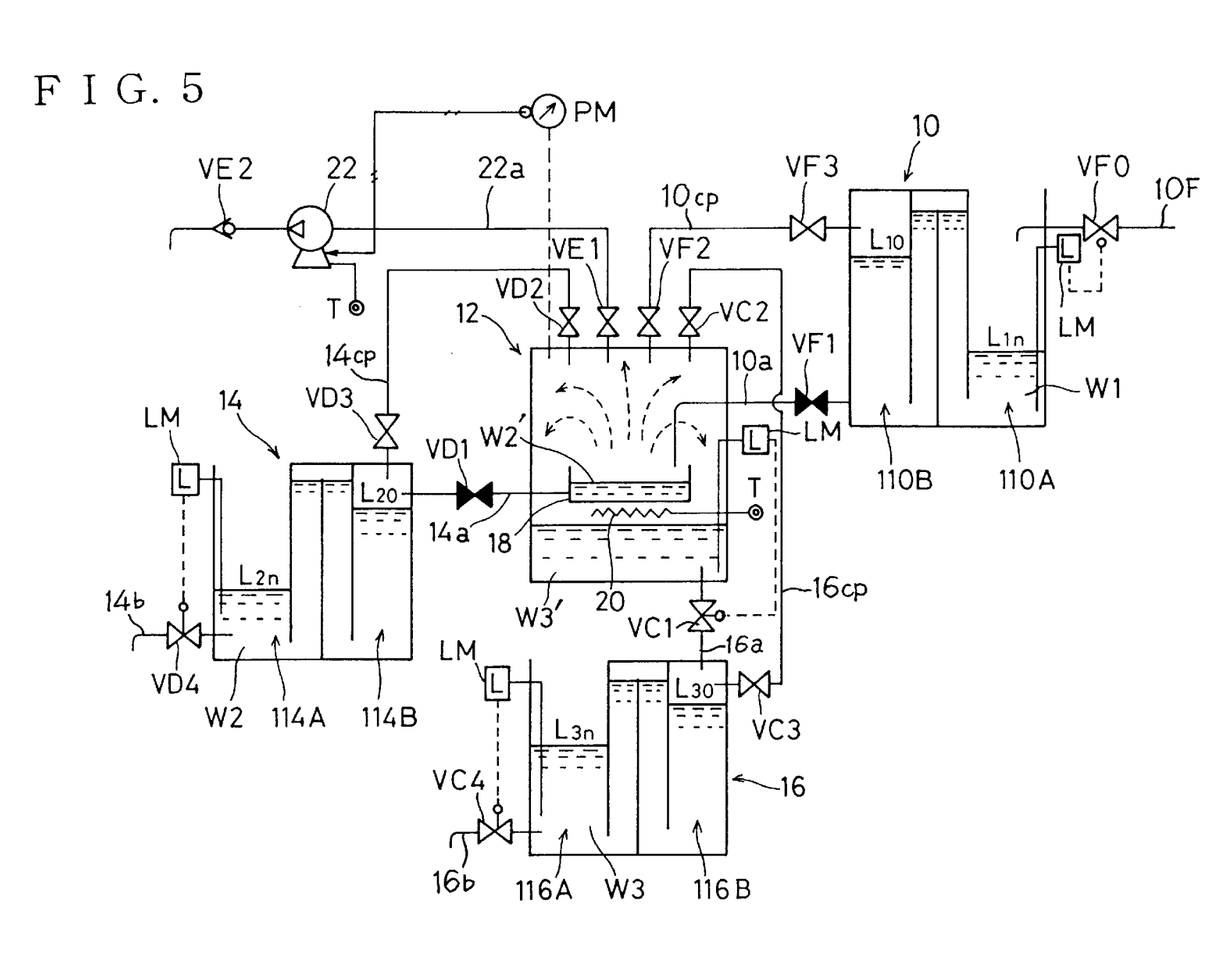
FIG. 5 is a schematic block and distribution diagram of the reduced-pressure distillation system of FIG. 1, showing automated control according to which continuous operation of the reduced-pressure distillation system is achieved.

To carry out continuous operation of the reduced-pressure distillation system according to the present invention, as shown in FIG. 5, water gages LM are provided for the open-to-atmosphere chamber 110A of the impure water tank 10, the separating tank 12, the open-to-atmosphere chamber 114A of the drainage tank 14, and the open-to-atmosphere chamber 116A of the collecting tank 16, respectively. Further, a pressure gage PM is provided for the separating chamber 12. Then, the impure water supply valve VF0 is controlled to be opened and closed depending on the water gage LM of the open-to-atmosphere chamber 110A of the impure water tank 10, and the collecting valve VC1 is controlled to be opened and closed depending on the water gage LM of the separating tank 12. Further, the drainage tank switching valve VD4 is controlled to be opened and closed depending on the water gage LM of the open-to-atmosphere chamber 114A of the drainage tank 14, and the collecting tank switching valve VC4 is controlled to be opened and closed depending on the water gage LM of the open-to-atmosphere chamber 116A of the collecting tank 16. Then, the vacuum pump 22 is driven and controlled depending on the pressure gage PM of the separating tank 12, while the impure water tank communicating valves VF2 and VF3, the drainage tank communicating valves VD2 and VD3, the collecting tank communicating valves VC2 and VC3, and the feed valve VF1 and the drainage valve VD1 are controlled to be opened and closed as appropriate by a controller, not shown.

By virtue of the construction described as above, automation of continuous operation of the reduced-pressure distillation system can be easily achieved by appropriately supplying impure water depending on the lowering of the level L1$n$ of the impure water W1 in the open-to-atmosphere chamber 110A of the impure water tank 10.

EXPERIMENTS 1 AND 2

A reduced-pressure distillation system according to the embodiment described as above was constructed by preparing a separating tank with the dimensions of 250 mm in width×200 mm in length×200 mm in height. The separating tank had an evaporator incorporated therein, which was formed of a metal plate with an evaporation area of 100,000 mm$^2$. The thus constructed system was employed to conduct reduced-pressure distillation experiments at different ambient temperatures by using sea water as impure water. As a result, the following experimental data were obtained:

|  | Experiment 1 | Experiment 2 |
|---|---|---|
| *Ambient temperature (° C.) | 27 | 28 |
| *Temperature of impure water at outlet of evaporator (° C.) | 39 | 41 |
| *Total quantity of flow of impure water (cc/H) | 148 | 150 |
| *Total quantity of condensed water (cc/H) | 55 | 56 |
| *Collection efficiency of purified water (%/H) | 37.2 | 37.3 |
| *Evaporation area in contact | 100,000 | 100,000 |

|  | Experiment 1 | Experiment 2 |
|---|---|---|
| with pressure-reduced gaseous phase (mm²) |  |  |

As is clear from the empirical data, it is proved that the reduced-pressure distillation for purifying water can be achieved with extremely good collection efficiency.

According to the reduced-pressure distillation system of the embodiment described above, the vacuum pump is driven only in the reduced pressure adjusting stage immediately before the startup of operation of the system and in a reduced pressure correcting stage after the operation. As a result, increased costs of operation due to long-term driving of the vacuum pump can be avoided. In this case, power source for driving the vacuum pump and the electric heater may be derived from solar power generation, and therefore the system can be used as a temporary reduced-pressure distillation system in an emergency.

While there has been described what are at present considered to be a preferred embodiment of the invention, it will be understood that various modifications may be made thereto, insofar as they fall within the spirit and scope of the invention. For example, the construction and arrangement of the impure water tank, the separating tank, the drainage tank, and the collecting tank may be variously changed. Further, the open-to-atmosphere chamber of each tank may be constructed as an outside pressure communicating chamber for making contact with outside pressure other than atmospheric pressure.

As understood from the embodiment described above, the reduced-pressure distillation system according to the present invention, includes an impure water tank, a separating tank, a drainage tank, and a collecting tank, the impure water tank, the drainage tank, and the collecting tank each having an outside pressure communicating chamber which makes contact with outside pressure such as atmospheric pressure, and a cell which communicates with the outside pressure communicating chamber corresponding thereto and is sealed with respect to the outside pressure such as the atmospheric pressure during operation of the reduced-pressure distillation system, the separating tank being sealed with respect to the outside pressure such as the atmospheric pressure and having an evaporator provided therein. The reduced-pressure distillation system further comprises feeding means for feeding impure water from the cell of the impure water tank to the evaporator of the separating tank, by using an effective head between a level of impure water stored in the impure water tank and a level of priming supplied to the drainage tank, discharging means for discharging remaining water in the evaporator to the cell of the drainage tank, collecting means for collecting purified water stored in a bottom portion of the separating tank into the cell of the collecting tank, the purified water being obtained by evaporating the impure water by activation of the evaporator of the separating tank, communicating means for communicating with the cell of each of the impure water tank, the drainage tank, and the collecting tank, respectively, via the separating tank, and evacuation means for carrying out evacuation within the separating tank to keep the each of the cells in a pressure-reduced state. As a result, the construction of the system is relatively simplified, and the operation is facilitated without depending only on the driving of the vacuum pump. These advantages leads to inexpensive manufacturing costs and operating costs, as well as to reduced facilities costs. The reduced-pressure distillation system of the invention has further advantages, such as small size and portability, as well as easy control and operation. Accordingly, it can cope with urgent operation in an emergency such as disaster.

What is claimed is:

1. A reduced-pressure distillation system comprising:

an impure water tank, a separating tank, a drainage tank, and a collecting tank, the impure water tank, the drainage tank, and the collecting tank each having an outside pressure communicating chamber, which makes contact with outside pressure, and a cell, which communicates with the outside pressure communicating chamber corresponding thereto and is sealed with respect to the outside pressure during operation of the reduced-pressure distillation system, the separating tank being sealed with respect to the outside pressure and having an evaporator provided therein;

means for feeding impure water from the cell of the impure water tank to the evaporator of the separating tank, by using an effective head between a level of impure water stored in the impure water tank and a level of priming water supplied to the drainage tank;

means for discharging remaining water in the evaporator to the cell of the drainage tank;

means for collecting purified water stored in a bottom portion of the separating tank into the cell of the collecting tank, the purified water being obtained by evaporating the impure water by activation of the evaporator of the separating tank;

means for communicating with the cells of the impure water tank, the drainage tank, and the collecting tank, respectively, through the separating tank; and means for carrying out evacuation within the separating tank to keep each of the cells in a pressure-reduced state.

2. The reduced-pressure distillation system claimed in claim 1, wherein the outside pressure communicating chamber of the impure water tank is supplied with the impure water to a predetermined level, the outside pressure communicating chamber of the drainage tank is supplied with the priming water to a predetermined level, the outside pressure communicating chamber of the collecting tank is supplied with purified water to a predetermined level, the cells of the impure water tank, the drainage tank, and the collecting tank, respectively, are allowed to communicate with each other, and the separating tank has its interior evacuated to reduce pressure within each of the cells, whereby levels of the impure water in the cell of the impure water tank, the priming water in the cell of the drainage tank, and the purified water in the cell of the collecting tank are kept constant with respect to the outside pressure.

3. The reduced-pressure distillation system claimed in claim 2, wherein after keeping constant the levels of the impure water in the cell of the impure water tank, the priming water in the cell of the drainage tank, and the purified water in the cell of the collecting tank, the cells of the impure water tank, the drainage tank, and the collecting tank, respectively, are selectively prevented from communicating with each other, whereby the impure water in the cell of the impure water tank is fed to the evaporator of the separating tank and the remaining water in the evaporator is discharged to the cell of said drainage tank, by using the effective head between the level of the priming water in the drainage tank.

4. The reduced-pressure distillation system claimed in claim 1, wherein after keeping constant the levels of the impure water in the cell of the impure water tank, the priming water in the cell of the drainage tank, and the purified water in the cell of the collecting tank, the cells of the impure water tank, the drainage tank, and the collecting tank, respectively, are selectively prevented from communicating with each other, whereby the impure water in the cell of the impure water tank is fed to the evaporator of the separating tank and the remaining water in the evaporator is discharged to the cell of said drainage tank, by using the effective head between the level of the priming water in the drainage tank.

* * * * *